United States Patent [19]

Haslund

[11] Patent Number: 5,069,397
[45] Date of Patent: Dec. 3, 1991

[54] STABILIZED AERO-OPTICAL FREE SHEAR LAYER INTERFACE

[75] Inventor: Ralph L. Haslund, Mercer Island, Wash.

[73] Assignee: The Boeing Company, Seattle, Wash.

[21] Appl. No.: 781,864

[22] Filed: Sep. 30, 1985

[51] Int. Cl.$^5$ ............................................ B64C 21/04
[52] U.S. Cl. ................................ 244/1 R; 244/129.1; 244/130; 244/207; 372/104; 359/509; 359/894
[58] Field of Search ................ 244/1 R, 129.1, 129.3, 244/124.4, 130, 207, 200; 350/319, 358; 372/104

[56] References Cited

U.S. PATENT DOCUMENTS

| | | | |
|---|---|---|---|
| 2,049,573 | 8/1936 | Stalker. | |
| 2,219,234 | 10/1940 | Messerschmitt | 244/209 |
| 2,430,431 | 11/1947 | Lanier | 244/207 |
| 2,841,182 | 7/1958 | Scala | 244/209 |
| 2,841,344 | 7/1958 | Stroukoff | 244/130 |
| 2,894,703 | 7/1959 | Hazen | 244/209 |
| 3,216,455 | 11/1965 | Cornell et al. | 244/130 |
| 3,360,221 | 12/1967 | Heskestad | 244/130 |
| 3,374,971 | 3/1968 | Heskestad | 244/209 |
| 3,437,371 | 4/1969 | Gallie | 244/130 |
| 3,836,237 | 9/1974 | Egan et al. | 350/319 |
| 3,934,846 | 1/1976 | Maurer. | |
| 3,951,360 | 4/1976 | Anyonnaz | 244/209 |
| 3,973,218 | 8/1976 | Kepler et al. | 350/319 |
| 3,973,219 | 8/1976 | Kepler et al. | 350/319 |
| 4,664,345 | 5/1987 | Lurz | 244/130 |
| 4,703,904 | 11/1987 | Haslund | 244/130 |

FOREIGN PATENT DOCUMENTS 8727   3/1915   United Kingdom ................ 350/584

OTHER PUBLICATIONS

Buell, "Airloads Near the Open Port of a One-Meter Airborne Telescope", AIAA Paper 75-71, Jan. 20-22, 1975.
Boeing Doc. No. D-180-28729, "Free Shear Layer Aero-Optic Jitter", P. Cassady, Apr. 1985.
Boeing Doc. No. D-180-28220-1, "Angular Deflection of a Light Ray Through a Free Shear Layer", P. Casady, Apr. 1985.
Boeing Doc. No. D-180-28219-1, "Compressible Turbulent Shear Layer Growth Over Optical Ports", P. Cassady, Apr. 1985.

Primary Examiner—Galen L. Barefoot
Attorney, Agent, or Firm—J. Michael Neary

[57] ABSTRACT

In an aero-optical interface for an aircraft optical aperture, the separation of the upstream boundary layer from the edge of the aperture creates a region of turbulance which persists downstream over the full area of the aperture. This invention promotes an early develpment of a steady velocity profile at the upstream aperture edge which is approximately the same as a stable, self-similar shear flow velocity profile over the entire aperture. This is accomplished by thickening the boundary layer upstream of the aperture, and blowing a curtain of air across the aperture from its upstream edge at the point of separation of the boundary flow. This produces a shear flow region foot that causes the overall velocity profile to be equal to a stable self-similar free shear layer.

40 Claims, 3 Drawing Sheets

STABILIZED AERO-OPTICAL FREE SHEAR LAYER INTERFACE

BACKGROUND OF THE INVENTION

This application is related to U.S. patent application Ser. No. 623,152 filed on Jun. 21, 1984, and entitled "Apparatus and Method for Providing an Aero-Optical Interface".

This invention relates to structure for providing an optically clear and steady shear layer over a port in the external skin of an airborne vehicle, and a method for achieving such a shear layer.

In certain circumstances it is desired to provide an optically and acoustically stable shear layer over an open port in the external skin of an airborne vehicle so that acoustic resonance in the cavity beneath the port is minimized, and so that light entering or leaving the port is subject to minimal diffusion. One acoustic application is in the wheel well of an aircraft which, in some prior art aircraft, resonates violently upon opening and subjects the structure and hydraulic lines within the cavity to unnecessary vibration. In addition, the noise can actually be heard by passengers and may cause unnecessary nervousness.

Another more recent need for an open port over which the flow is acoustically and optically stable is in infrared scanning of the heavens from an aircraft. The infrared detectors in the scanners are extremely sensitive and the signal processing equipment extremely sophisticated, but unless the optical signal is clear and steady the value of the data is decreased. The clarity (i.e., intensity distribution and size) and steadiness of the optical image are affected by the shear layer over the open port in the airborne vehicle and vary with variations in air density within the shear layer. These density variations have heretofore been studied but little effort has been made to actually control the formation of the shear layer and to influence its properties.

SUMMARY OF THE INVENTION

Accordingly, it is an object of this invention to provide a method and apparatus for promoting and controlling the growth and propagation of a shear layer that is steady and clear to allow the transmission of a steady and clear beam of light through an open port through the external skin of an airborne vehicle.

The objects of the invention are attained in a preferred embodiment for promoting the formation and growth of a clear and steady shear layer over a port in the external skin of an airborne vehicle, including a nozzle on the upstream side of the port for blowing a jet of air over the port and up along the shear layer. The jet of air is at the same total temperature as the free stream, and is at a mass flow rate equal to that of the incident freestream flow through an area equal to about 1-4 percent of the port area. The jet is aimed up into the shear layer at about 1-15 degrees from the plane of the external skin of the airborne vehicle with a thickness equal to about 10 percent of the port streamwise length at the upstream edge of the opening. The clear and steady transition region from the upstream edge of the port down stream to the commencement of the fully developed portion of the shear layer, where large scale turbulence commences, is at least 8-10 times the thickness of the boundary layer of the gas stream at the upstream side of the opening. The boundary layer can be thickened upstream of the port by the use of a roughness strip, such as sandpaper or a band of upstanding pins.

DESCRIPTION OF THE DRAWINGS

The invention, and its many attendant objects and advantages, will become better understood upon reading the description of the preferred embodiment in conjunction with the following drawings, wherein.

DESCRIPTION OF THE PREFERRED EMBODIMENT

Figure 1:
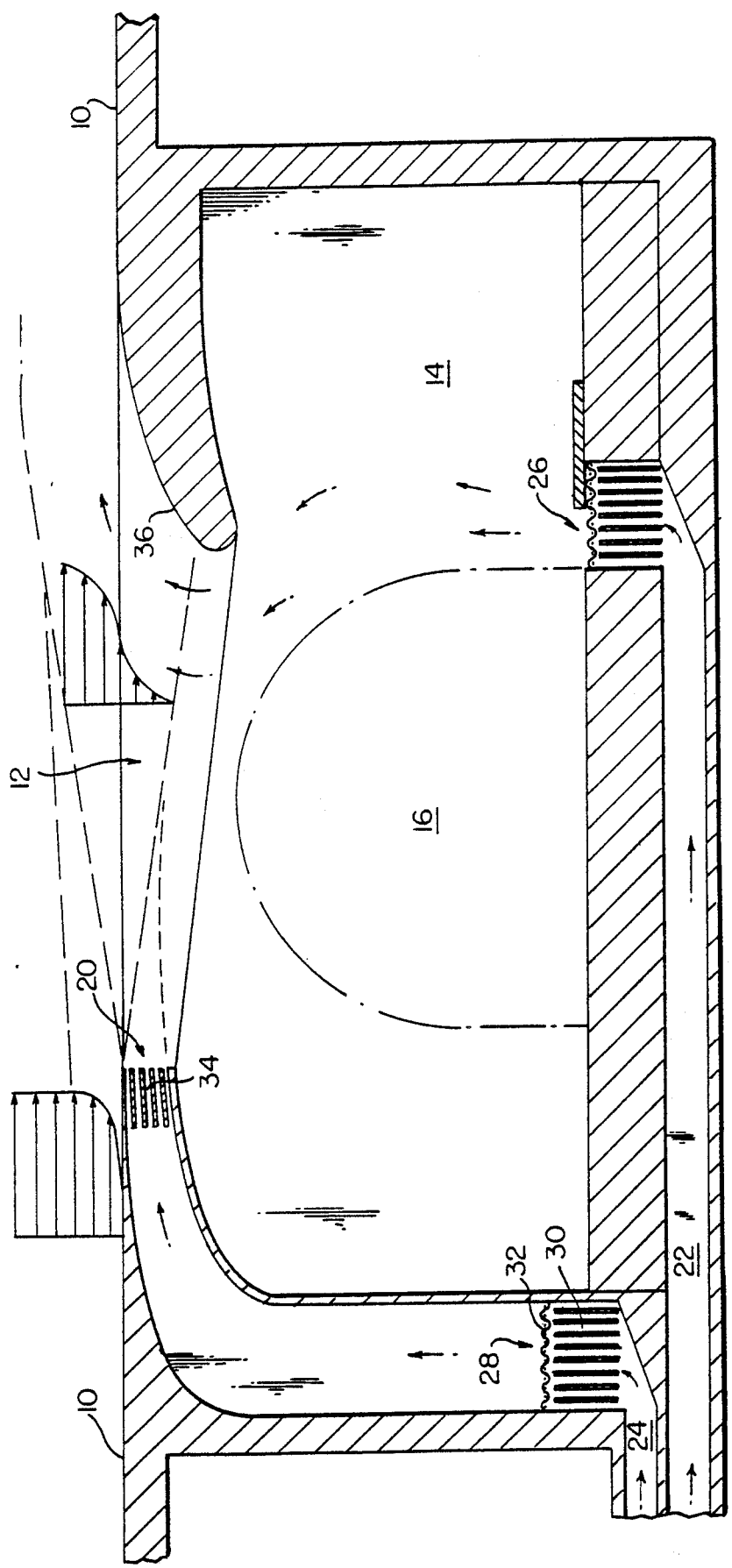
FIG. 1 is a schematic sectional elevation of an opening in the external skin of an airborne vehicle showing the structure according to one embodiment of the invention for achieving a clear and steady shear layer over the port.

Turning now to the drawings, wherein like reference characters, designate identical or corresponding parts, and more particularly to FIG. 1 thereof, a cross section of a portion of an airborne vehicle is shown having an exterior skin 10 in which is formed an opening or port 12 for passage of beams of light into or out of a cavity 14 underlying the port 12. An optical instrument 16 may be placed within the cavity 14 for transmitting or receiving light beams to or from the heavens.

It is desired to control the nature of the shear layer over the optical port 12 so that the beam of light into or out of the port is diffused as little as possible. Diffusion of the light beam occurs by several mechanisms. First, the shear layer over the optical port can experience large scale shifting or rotating movements which tend to create unpredictable and random shifting of the light beam so that the apparent direction of the light beam continually changes in an unpredictable manner. This phenomena is commonly referred to as "image wander or jitter".

Another mechanism for diffusion of the light beam, called "unsteady defocus", is caused by large scale turbulence within the shear layer. The large scale turbulence causes the image to change shape on the focal plane in a manner which makes it difficult to determine the true center of the image.

The third diffusion mechanism is commonly called "scattering" of the light beam and is caused by small scale turbulence in the shear layer. The scattering of the light beam results in a weakening in intensity of the image and is by far the least serious of the three diffusion mechanisms since it is does not mathematically affect where the center of the weakened image occurs. Of course, a certain refraction of the light beam will occur by reason of the change in density through the shear layer from the free stream velocity to the quiescent condition of the air within the cavity, but this refraction can be easily corrected mathematically by the signal processing equipment and does not cause a problem.

The key to achieving a useful clear and steady image, therefore, is to produce a shear layer over the open optical port that is steady and free of large scale turbulence.

In my prior related application, I disclosed a structure and method for producing an undeflected, planar, two dimensional, self-similar, minimum thickness shear layer profile over an open cavity. Although this shear layer was a great improvement over the prior art, it did require a formation distance between separation from the upstream edge of the cavity and the self-similarity region equal to about $4 \times 10^5$ $v/v_e$ for laminar upstream boundary layers, and about $2 \times 10^6$ $v/v_e$ for turbulent upstream boundary layers, where "v" equals the kinematic viscosity of the air stream, and "$v_e$?" equals the local boundary layer edge velocity. The formation distance was usually an unsteady mixing layer characterized by a series of nearly random vortices that pass on downstream in the shear flow.

Figure 5:
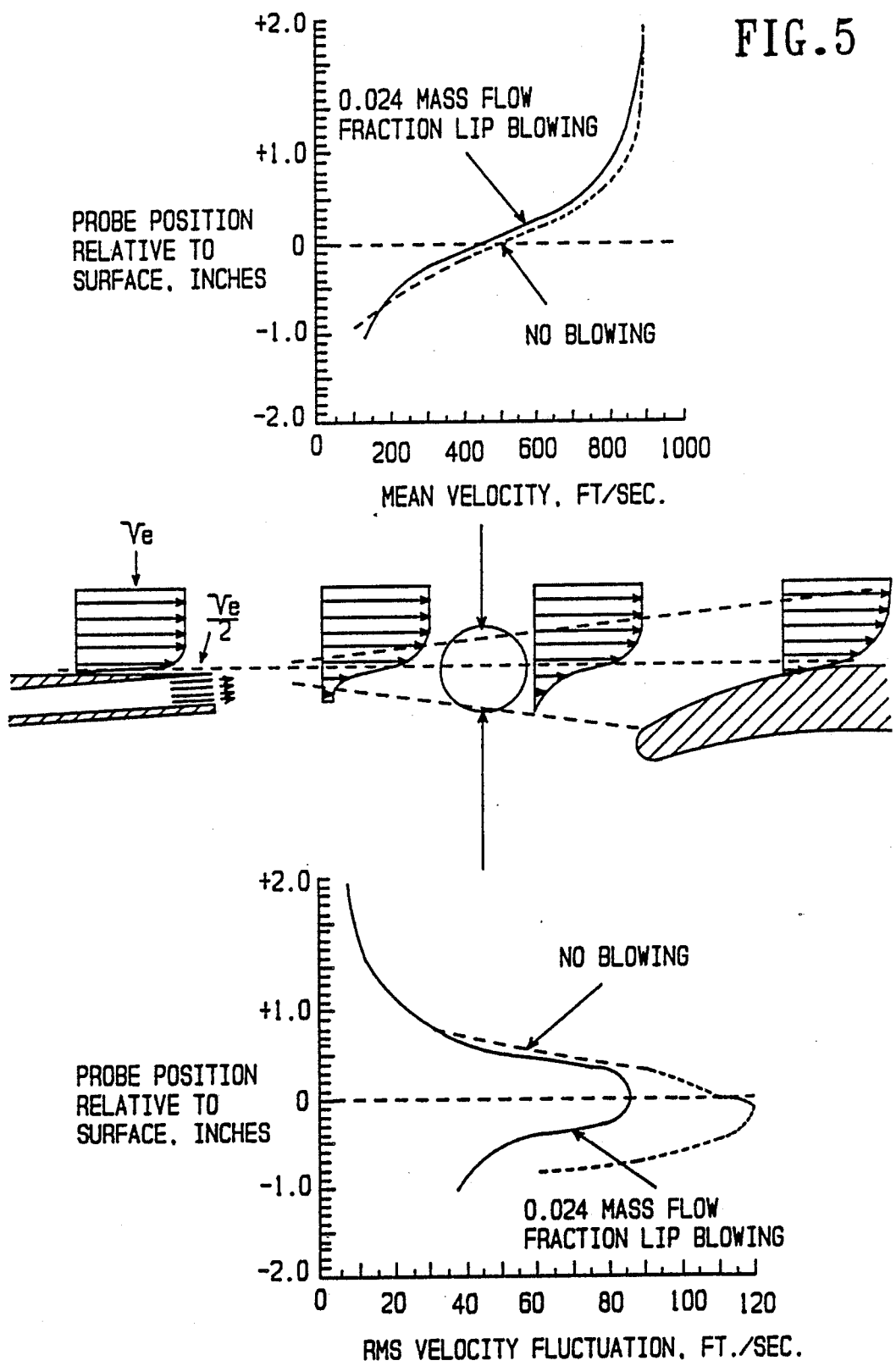
FIG. 5 is a cross-sectional schematic elevation of the invention shown in FIG. 1 showing the growth of the shear layer over the optical port in the airborne vehicle and examples of measured velocity and fluctuation intensity profiles.

To both introduce steadiness and accelerate formation of a self-similar shear flow velocity profile after separation of the boundary layer from the upstream edge of the port, a nozzle 20 is provided at the upstream edge of the port to blow air approximately tangentially across the opening at a shallow angle, between 0 and 15 degrees. The nozzle blows a jet of air across the entire width of the opening at a mass flow rate equal to that of the incident freestream through an area equal to about 1-4 percent of the port area. Preferably, the mass flow fraction of the jet is about 2 percent since that seems to produce the optium optical and acoustic properties at a minimal flow rate. However, the mass flow fraction can be increased above 3 percent without injury to the optical properties. The added flow appears to simply lift the shear layer higher above the cavity and position the reattachment of the shear layer on the downstream edge of the vehicle skin slightly downstream from the normal reattachment zone. The thickness of the nozzle in this embodiment is about 10 percent of the port streamwise length which allows the appropriate depth of flow of air into the shear layer at a velocity of about one order of magnitude less than the freestream velocity. As shown in FIG. 5, the effect of the lip blowing through the nozzle has the immediate effect of adding a low velocity tail on the velocity profile of the shear layer just developing downstream from the upstream edge of the cavity. This steadies the separation process and greatly accelerates creation of a similar shear layer velocity profile that retains its self-similarity as it becomes thicker in passing downstream over the cavity. Although the velocity profile is not perfectly self-similar, it is very close with the use of lip blowing. The properties of the shear layer are dominated by the profile on the high speed side of the mean velocity, and nearly ideal optical transmission properties are obtained. The increase in thickness of the shear layer does not damage the optical quality of the beam coming through the shear layer since the shear layer is steady and the large scale turbulence characteristic of a fully developed shear layer no longer dominated by the upstream boundary layer thickness has not yet occurred.

In some circumstances it is desirable to provide additional air from within the cavity to feed the shear layer at its downstream regions. The upstream regions of the shear layer are fully fed by the nozzle 20, but when the port is at its greatest dimension, the entrainment of the gas by the shear layer can include gas from the cavity at the extreme downstream terminal regions of the free shear layer beyond the influence at the nozzle flow, so that in these circumstances it is well to provide a source of gas to feed these downstream regions of shear layer.

As shown in FIG. 1, an opening is provided, communicating through channels 22 and 24 with a source of pressurized air such as aircraft ram air (not shown in FIG. 1) up into the cavity opening and the nozzle respectively. The channel 22 feeds the cavity opening through a flow smoothing honeycomb and screen structure 26 to remove any turbulence or eddies which would be created by turbulent air entering the cavity through the opening 26. Likewise a flow smoother 28 is provided in the channel leading to the nozzle 20. The flow smoother 28 includes a honeycomb structure 30 and a fine screen 32 over the top of the honeycomb 30. A flow straightener 34 composed of honeycomb alone with cell size length-to-diameter ratio on the order of 8 to 1 is preferred in the nozzle 20 exit, especially if the channel under the surface is short.

Figure 3:
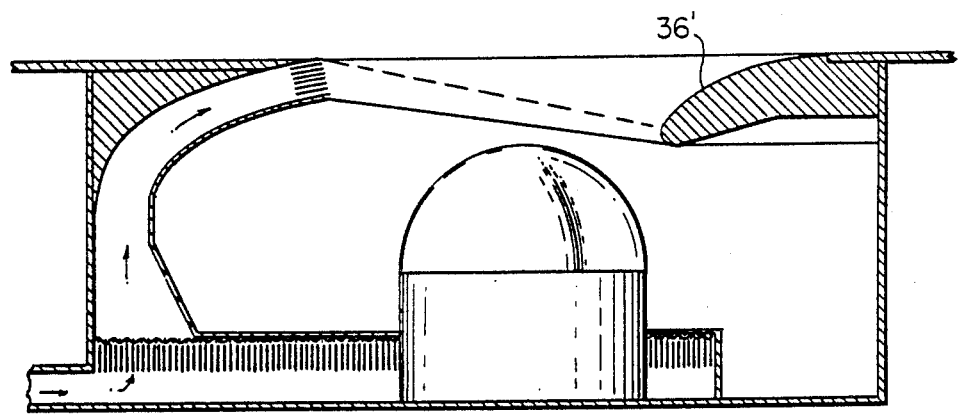
FIG. 3 is a schematic cross-sectional elevation of a variant of the embodiment shown in FIG. 1.
Figure 4:
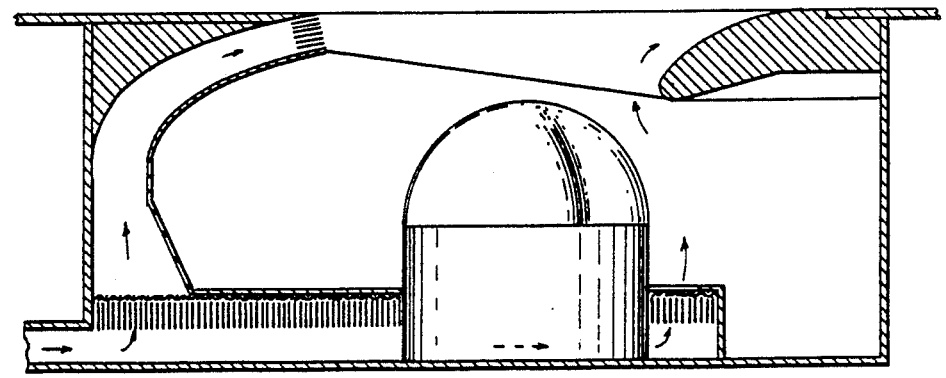
FIG. 4 is a schematic cross-sectional elevation of a second variant of the invention shown in FIG. 1.

A reattachment ramp 36 is provided at the downstream edge of the cavity 14. The reattachment ramp is a curved structure which curves down into the cavity into a position designed to intercept the shear layer and promote smooth reattachment of the shear layer back to the external skin of the vehicle. The reattachment ramp shown in FIG. 3 is at a 45 degree angle to the plane of the exterior skin. A variant of the reattachment ramp shown in FIG. 3 is shown in FIG. 4 wherein the angle of the reattachment ramp is at 30 degrees from the plane of the external skin and the ramp does not extend as deeply into the cavity, thereby reducing the possibility of interfering with the optics within the cavity. This reattachment ramp is suitable for smaller cavities or for cavities which have a shear layer which will grow at a shallower angle than the shear layer growth shown in FIG. 3. Generally, the deeper the ramp the lower the blowing mass fraction required to optimize the shear flow.

Figure 2:
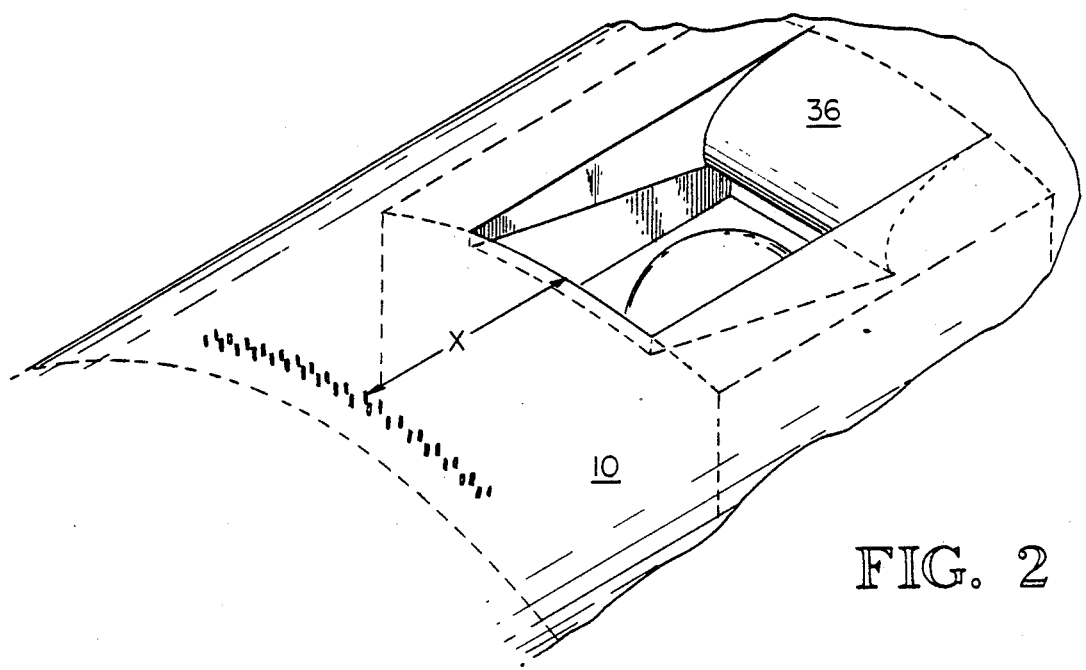
FIG. 2 is an isometric view of a section of the external skin of the aircraft shown in FIG. 1 showing the optical port and also showing the upstream structure for thickening the boundary layer upstream of the optical port.

As shown in FIG. 2, a boundary layer thickening structure is provided upstream of the optical port 12. The boundary layer thickening structure is a series of pins which extend vertically from the external skin of the vehicle at least 100 roughness diameters from the upstream edge of the optical port. The roughness region extends laterally beyond the optical port on both sides so that the edge of the thickened boundary layer lies beyond the sides of the optical port, that is, the edges of the thickened boundary layer do not intercept the upstream edge of the optical port which would perturb the desired steady and clear shear layer over the optical port. The length of the small scale turbulence transition region from the upstream edge of the optical port to the fully developed large scale turbulence shear layer is about 8-10 times the thickness of the boundary layer at the separation edge. By thickening the fully developed turbulent boundary layer upstream of separation, the initial steady relatively smooth sided transition region can be made as long as desired.

Other techniques for thickening the boundary layer include pins or bolt heads screwed into the skin of the vehicle, or a strip of grit, like sandpaper, attached to the surface. The prescription of leaving a space of at least 100 roughness diameters upstream of the separation edge is to allow the turbulent wakes from the roughness region to coalesce into a uniform layer.

The injection velocity through the nozzle 20 may be an order of magnitude smaller than the free stream velocity. The actual velocity varies inversely with the thickness of the lip jet. The total blowing mass flow rate in all cases is about 2 percent of the mass fraction which is defined as the incident free stream mass flow rate per unit area multiplied by the optical port open area. The optimum lip blowing jet thickness is appropriately 1/10 of the optical port streamwise length. The upper edge of the nozzle should constitute a wedge of material which has structural integrity and does not itself create eddies in the airstream off of the upstream edge of the opening. The rate of air blowing through the flow smoother 26 at the bottom of the cavity just forward of the leading edge of the ramp is about 1/5 of the lip blowing rate.

The evaluation of the boundary layer-shear layer velocity profile is shown in FIG. 5. Apparently, the reason that the small blowing mass fraction is able to stabilize and clarify the shear layer is that the low velocity foot of the boundary layer up to $v_e/2$ before separation has very little momentum to overcome.

In general, for a turbulent layer, the distance to $v_e/2$ is less than one percent of the overall boundary layer thickness from the wall because of the extremely steep (typically 7th power) velocity profile. The tangential blowing to fill in the foot of the upstream solid wall boundary layer profile reverses the profile curvature below $v_e/2$. The center of curvature thus goes from upstream to downstream of the foot of the velocity profile. The curvature above $v_e/2$ remains relatively unchanged. Measured velocity profiles near the center of the port with and without blowing are shown in FIG. 5. The major portion of the mass flow is above $v_e/2$ in all cases.

Since optical scatter varies exponentially with the square of the density fluctuation in the gas through which the optical beam is transmitted, lip blowing substantially reduces the optical density loss due to scatter since the fluctuation maximum with lip blowing is about 2/3 as large as that without lip blowing for edge Mach numbers above 0.3, which is the range in which compressibility is significant. Measured fluctuation profiles with and without flowing near the center of the port are shown in FIG. 5.

Thus, the invention provides a shear layer without a large scale vortex structure so that light transmitted through such a shear layer can be focused to produce much smaller images of point objects than when transmitted through a shear layer with large vortices. The invention disclosed herein therefore improves the treatment of optical transmission properties by including defocus as well as wander and jitter. Obviously, numerous modifications and variations of the preferred embodiment disclosed herein will occur to those skilled in the art. Therefore it is to be expressly understood that these modifications and variations, and the equivalents thereof, may be practiced while remaining within the spirit and scope of the invention as defined in the following claims.

I claim:

1. An optical port through the exterior skin of a vehicle for use in a high velocity gas stream, comprising:
   means in said skin defining an opening therethrough than about 5 inches in the streamwise direction of said gas stream;
   means on the upstream side of said opening adjacent the exterior surface of said skin defining a nozzle extending completely across said opening in the direction transverse to said streamwise direction; and
   means for blowing gas through said nozzle of about the same total temperature as said gas stream into said gas stream to stabilize the transition region of the shear layer of said gas stream downstream of said upstream side of said opening.

2. The optical port defined in claim 1, wherein said nozzle is aimed at an angle of about 0°-15° upward from the plane of said exterior surface along the downstream direction of said gas stream.

3. The optical port defined in claim 2, wherein said nozzle angle is about 10°.

4. The optical port defined in claim 1, wherein said nozzle depth is about 1/10 of the port streamwise opening length over the full width of said opening.

5. The optical port defined in claim 1, wherein said gas blowing means is adjusted to blow gas at a volume rate sufficient to stabilize the transition region of said shear layer to at least 8-10 times the thickness of the boundary layer of said gas stream at said upstream side of said opening.

6. The optical port defined in claim 5, wherein said gas blowing mass flow rate through said nozzle is equal to the freestream mass flow rate through an area equal to about 1%-4% of the port opening area.

7. The optical port defined in claim 5, wherein said gas blowing mass flow rate through said nozzle is equal to the freestream mass flow rate through an area equal to about 2% of the port opening area.

8. The optical port defined in claim 5, wherein said gas blowing means is adjusted to blow gas through said nozzle at about 0.1 times the freestream velocity of said gas stream.

9. The optical port defined in claim 1, further comprising means upstream of said upstream side of said opening to increase the thickness of the boundary layer thereof to the order of one length of the optical port streamwise opening length.

10. The optical port defined in claim 9, wherein said boundary layer thickening means is positioned upstream of said upstream side at least 100 roughness diameters therefrom.

11. The optical port defined in claim 10, wherein said thickening means extends transversely across said streamwise direction parallel to said upstream side and beyond the two streamwise sides of said opening so that the edges of said thickened boundary layer lie beyond said streamwise sides of said opening.

12. The optical port defined in claim 1, further comprising:
   outward blowing means on said downstream side of said opening for blowing gas through said opening adjacent the downstream side thereof to feed gas into said shear layer in the downstream region thereof.

13. The optical port defined in claim 12, wherein said outward blowing means and said nozzle blowing means together blow with mass flow equal to that of the freestream through an area equal to about 1%-4% of the port area.

14. The optical port defined in claim 1, wherein said vehicle is an airborne vehicle, and said gas stream is the air through which said vehicle flies.

15. The optical port defined in claim 1, further comprising:

a reattachment ramp structure connected to the downstream side of said opening having an upper ramp surface extending forward and downward at an angle between about 35°–45° and terminating in a rounded leading edge.

16. The apparatus defined in claim 1, further comprising:
   means defining a cavity opening in the exterior skin of said vehicle, said optical port constituting the opening of said cavity in the exterior skin of said vehicle, said cavity having a floor spaced from said exterior skin;
   means for blowing gas through said optical port from the floor of said cavity at a rate lesser than the rate of blowing through said nozzle.

17. A method of establishing an optically steady and clear shear layer of gas over an opening in a vehicle exterior skin operating in a high velocity gas stream, comprising:
   blowing a jet of the same gas as that in said gas stream, at substantially the same total temperature as said freestream total temperature, into said shear layer over said opening.

18. The method defined in claim 17, wherein said gas is blown into the shear layer over said opening with mass flow equivalent to that of the freestream through an area equal to about 1%–4% of the said opening.

19. The method defined in claim 17, wherein said jet is as wide as said opening and is between 50%–100% as thick as the boundary layer immediately upstream of said opening.

20. The method defined in claim 17, wherein said jet is blown into said shear layer at the upstream edge of said opening.

21. The method defined in claim 17, wherein said jet is directed downstream of said gas stream at an angle between 0°–15° above the plane of said exterior skin.

22. The method defined in claim 17, wherein said jet velocity is about one tenth of the freestream velocity of said gas stream.

23. In a vehicle, adapted for airborne operations, having an open optical port through an exterior skin, said vehicle, when in high speed motion through the air, having an air stream past the vehicle induced by the motion of the vehicle through the air, the air stream including a freestream spaced from the vehicle exterior skin, a boundary layer between said freestream and said exterior skin, and a free shear layer between said freestream and the region within said open port, said port having an upstream edge and a downstream edge, wherein the improvement comprises apparatus for establishing and maintaining a stable, optically clear, free shear layer over said open optical port, said apparatus including:
   a nozzle adjacent said upstream edge of said open optical port, said nozzle extending completely across said upstream edge;
   means for blowing gas through said nozzle over said open optical port at a mass flow rate selected to stabilize and lengthen a transition region, characterized by small scale turbulence and extending between said upstream edge and the beginning of a fully developed large scale turbulence shear layer, such that said transition region completely covers said open optical port.

24. The apparatus defined in claim 23, wherein said nozzle is aimed at an angle of about 0°–15° upward from the plane of said exterior skin along the downstream direction of said air stream.

25. The apparatus defined in claim 24, wherein said nozzle angle is about 10°.

26. The apparatus defined in claim 23, wherein said nozzle has a depth of about 1/10 of the port streamwise opening length over the full width of said port.

27. The apparatus defined in claim 23, wherein said gas blowing means is adjusted to blow air at a mass flow rate sufficient to stabilize the transition region of said shear layer to at least 8–10 times the thickness of the boundary layer of said air stream at said upstream edge of said port.

28. The apparatus defined in claim 27, wherein said gas blowing means is adjusted to blow gas through said nozzle at a mass flow rate about equal to the freestream mass flow rate through an area equal to about 1%–4% of the port opening area.

29. The apparatus defined in claim 27, wherein said gas blowing means is adjusted to blow gas through said nozzle at a mass flow rate about equal to the freestream mass flow through an area equal to about 2% of the port opening area.

30. The optical port defined in claim 27, wherein said gas blowing means is adjusted to blow gas through said nozzle at about 0.1 times the freestream velocity of said gas stream.

31. The apparatus defined in claim 23, wherein said nozzle depth is about equal to 50%–100% of the thickness of the boundary layer immediately upstream of said opening.

32. The apparatus defined in claim 23, wherein said gas blowing means includes a channel communicating between a region of ram-pressurized air and said nozzle.

33. The apparatus defined in claim 23, further comprising:
   a reattachment ramp structure connected to said open optical port on the downstream side thereof, said structure having an upper ramp surface extending forward and downward at an angle between about 30°–45° and terminating in a rounded leading edge.

34. An airborne vehicle adapted for high speed, subsonic flight through the air, creating thereby relative to said vehicle a high velocity freestream and a boundary layer between the vehicle and the freestream, said vehicle having an exterior surface and an open port in the exterior surface which includes an upstream edge and a downstream edge and two spaced streamwise sides, wherein the improvement comprises an apparatus for establishing and maintaining, over the open port, a stable free shear layer that is substantially free of optical distortion, including:
   a nozzle positioned adjacent said upstream edge of said open port and aimed to blow gas downstream over said port at an angle of about 0°–15° above the plane of the vehicle surface;
   means for supplying gas to said nozzle at the same total temperature as said freestream at a mass flow rate sufficient to provide a stable transition region, extending from said port upstream edge to a location downstream therefrom at which large scale turbulence is developed, said stable transition region extending streamwise a length at least 8–10 times the thickness of the boundary layer upstream of said nozzle, and characterized by small scale turbulence.

35. The apparatus defined in claim 34, wherein:

said gas supplying means provides gas to said nozzle at a rate sufficient to produce a jet of gas at a velocity at least as great as an order of magnitude less that the freestream velocity.

36. The apparatus defined in claim 34, further including:
a reattachment ramp connected to said downstream edge and projecting upstream therefrom, said ramp having an upper surface lying at an angle of about 30°–45° down from the plane of said vehicle skin and terminating in a rounded leading edge.

37. The apparatus defined in claim 34, wherein:
said gas supplying means supplies gas to said nozzle at a mass flow rate equal to the mass flow rate of said freestream through an area equal to about 1%–4% of said port area.

38. The apparatus defined in claim 34, wherein:
said nozzle extends completely across said upstream edge of said port and has an opening depth about 10% of the streamwise length of said port.

39. The apparatus defined in claim 34, wherein:
said gas supplying means supplies gas to said nozzle at a rate to produce a jet of gas that is 50%–100% as thick as the boundary layer adjacent to the upstream edge of said port and upstream of said nozzle.

40. The apparatus defined in claim 34, further comprising:
means defining a cavity opening in the exterior skin of said vehicle, said optical port constituting the opening of said cavity in the exterior skin of said vehicle, said cavity having a floor spaced from said exterior skin;
means for blowing gas through said optical port from the floor of said cavity at a rate lesser than the rate of blowing through said nozzle.

* * * * *